United States Patent
Maalioune

(10) Patent No.: US 8,975,911 B2
(45) Date of Patent: Mar. 10, 2015

(54) SYSTEM FOR CONTROLLING AT LEAST ONE ACTUATOR OF THE COWLINGS OF A TURBOJET ENGINE THRUST REVERSER

(75) Inventor: Hakim Maalioune, Orgeval (FR)

(73) Assignee: Aircelle, Gonfreville l'Orcher (FR)

( * ) Notice: Subject to any disclaimer, the term of this patent is extended or adjusted under 35 U.S.C. 154(b) by 295 days.

(21) Appl. No.: 12/673,803

(22) PCT Filed: Jul. 7, 2008

(86) PCT No.: PCT/FR2008/000979
§ 371 (c)(1),
(2), (4) Date: Feb. 17, 2010

(87) PCT Pub. No.: WO2009/034247
PCT Pub. Date: Mar. 19, 2009

(65) Prior Publication Data
US 2011/0050277 A1  Mar. 3, 2011

(30) Foreign Application Priority Data
Aug. 20, 2007 (FR) ...................... 07 05925

(51) Int. Cl.
*G01R 31/34* (2006.01)
*F02K 1/72* (2006.01)
(Continued)

(52) U.S. Cl.
CPC .............. *F02K 1/72* (2013.01); *F01D 21/003* (2013.01); *F02K 1/763* (2013.01); *F02K 1/766* (2013.01); *G05B 9/02* (2013.01); *G05B 23/0235* (2013.01); *G05B 23/0286* (2013.01); *Y02T 50/671* (2013.01)
USPC .................. 324/765.01; 244/110 B; 60/226.2

(58) Field of Classification Search
CPC ..................................................... H02P 29/021
USPC .............. 244/110 B; 324/765.01, 537, 750.3; 60/226.2
See application file for complete search history.

(56) References Cited

U.S. PATENT DOCUMENTS 6,098,011 A * 8/2000 Scott ............................ 701/100
6,145,786 A * 11/2000 Baudu et al. .............. 244/110 B
(Continued)

FOREIGN PATENT DOCUMENTS

EP 0843089 A1 5/1998
FR 2872223 A1 12/2005

OTHER PUBLICATIONS

International Search Report PCT/FR2008/000979; Dated Feb. 18, 2009.
(Continued)

*Primary Examiner* — Huy Q Phan
*Assistant Examiner* — Giovanni Astacio-Oquendo
(74) *Attorney, Agent, or Firm* — Brinks Gilson & Lione

(57) ABSTRACT

The control system of the invention includes at least one actuator (6) for a cowling (2), driven by at least one electric motor (7), and control means (9) for the electric motor (7) and the actuator (6). The control system includes an electric circuit (C) that comprises: a plurality of electric components; a plurality of measuring means (16-18) adapted for measuring respectively a characteristic magnitude of an electric component or a group of electric components in the electric circuit; a failure detection means (19) adapted for detecting a failure at a component of the electric circuit when the characteristic magnitude measured at said component exceeds a predetermined value or is in a range of predetermined values.

4 Claims, 2 Drawing Sheets

(51) Int. Cl.
*F01D 21/00* (2006.01)
*F02K 1/76* (2006.01)
*G05B 9/02* (2006.01)
*G05B 23/02* (2006.01)

(56) References Cited

U.S. PATENT DOCUMENTS

| | | | | |
|---|---|---|---|---|
| 6,519,929 B2* | 2/2003 | Ahrendt | ........................ | 60/226.2 |
| 6,598,386 B2* | 7/2003 | Johnson et al. | .............. | 60/226.2 |
| 6,655,125 B2* | 12/2003 | Johnson et al. | .............. | 60/226.2 |
| 6,681,559 B2* | 1/2004 | Johnson | ........................ | 60/204 |
| 6,975,936 B2* | 12/2005 | Akuzawa et al. | ............. | 701/114 |
| 7,278,257 B2* | 10/2007 | Colotte et al. | ............... | 60/226.2 |
| 7,370,468 B2* | 5/2008 | Colotte et al. | ............... | 60/226.2 |
| 7,384,494 B2* | 6/2008 | Kosty et al. | .................... | 156/211 |
| 7,664,595 B2* | 2/2010 | Groer et al. | .................... | 701/114 |
| 7,834,494 B2* | 11/2010 | Blanding et al. | ............ | 310/68 B |
| 8,170,771 B2* | 5/2012 | Calmelat et al. | ............. | 701/100 |
| 8,670,894 B2* | 3/2014 | Wang et al. | .................. | 701/30.4 |
| 2003/0070416 A1* | 4/2003 | Johnson et al. | ............. | 60/226.2 |
| 2003/0204777 A1 | 10/2003 | Kojori | | |

OTHER PUBLICATIONS

Frank A. DeWinter, et al., "Maximizing Large Drive Availability", IEEE Industry Applications Magazine, www.IEEE.ORG/IAS, Jul./Aug. 2002, pp. 66-75.

Rene Spee, et al. "Remedial Strategies for Brushless DC Drive Failures", IEEE Transactions on Industry Appications, vol. 26, No. 2, Mar./Apr. 1990, pp. 259-266.

* cited by examiner

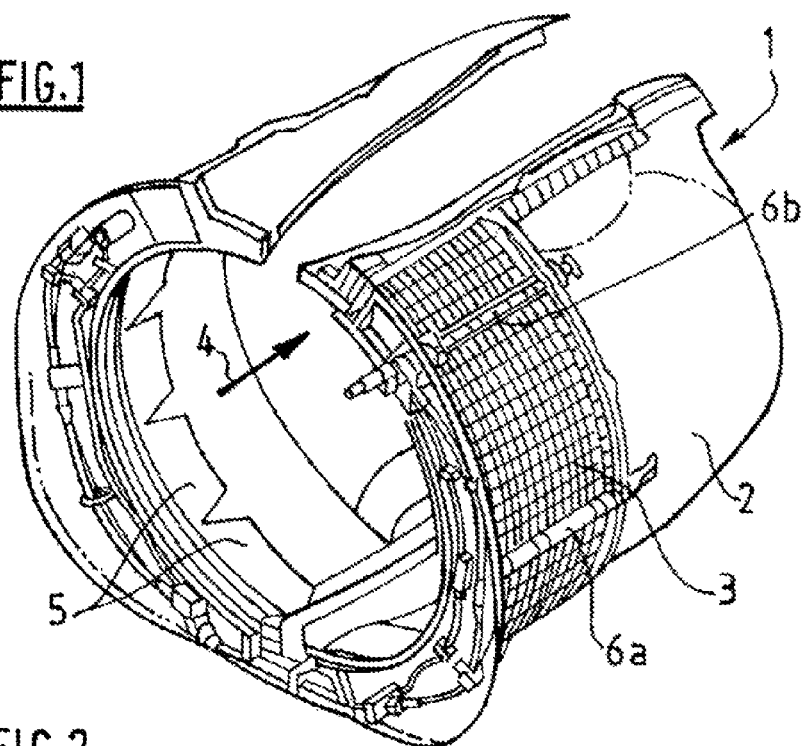
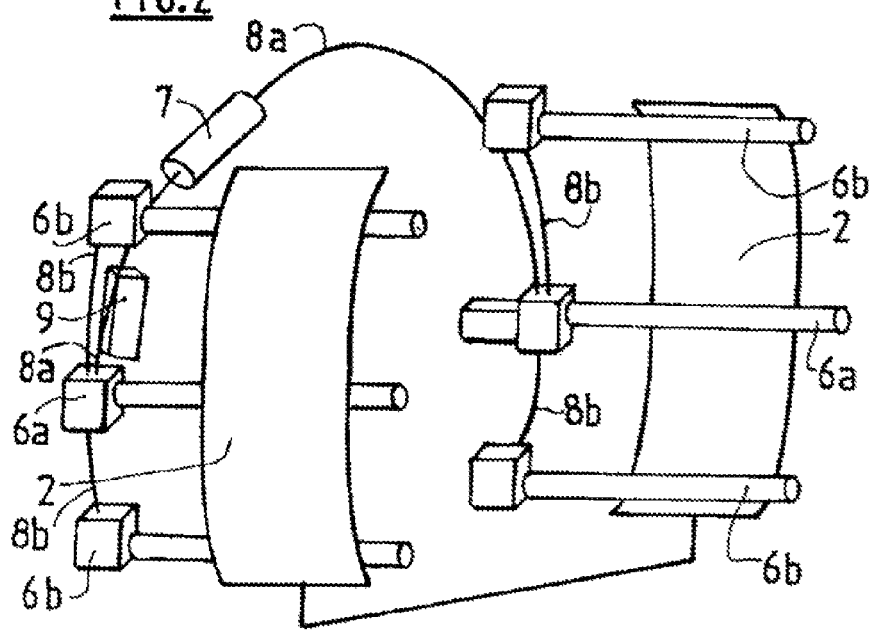

US 8,975,911 B2

SYSTEM FOR CONTROLLING AT LEAST ONE ACTUATOR OF THE COWLINGS OF A TURBOJET ENGINE THRUST REVERSER

TECHNICAL FIELD

This invention relates to a control system for at least one actuator for the cowlings of a turbojet engine thrust reverser.

BACKGROUND

The purpose of a thrust reverser during plane landing is to improve the braking capacity of a plane by redirecting forwards at least part of the thrust generated by the turbojet engine. In this phase, the reverser blocks the jet pipe propelling nozzle and directs the exhaust flow of the engine toward the front of the nacelle, thereby generating a counter-thrust that complements the braking of the wheels of the plane.

The means implemented to redirect the flow varies depending on the type of reverser. However, in all cases, the structure of a reverser includes mobile cowlings that are moveable between, firstly, a deployed position in which they open in the nacelle a passage intended for the deviated flow, and secondly, a stowed position in which they close this passage. These mobile cowlings can also perform a deviation function or simply an activation function for other deviation means.

In cascade reversers, for example, the mobile cowlings slide along rails such that when withdrawing during the opening phase, they uncover the deviation cascades arranged in the thickness of the nacelle. A system of rods connect this cowling to the blocking doors that are deployed inside the exhaust duct and block the direct flow output. In door reversers, conversely, each mobile cowling pivots such that it blocks the flow and deviates it and is therefore active in this redirecting.

In general, these mobile cowlings are actuated by hydraulic or pneumatic jacks that require a pressurized fluid delivery network. This pressurized fluid is classically obtained by air bleed on the turbojet engine in pneumatic systems, or taken from the plane's hydraulic circuit. Such systems require significant maintenance since small leaks in the hydraulic or pneumatic network may be difficult to detect and could have damaging effects on the inverser and other parts of the nacelle. Furthermore, on account of the limited space available in the front frame of the reverser, installing and protecting such a circuit is particularly difficult and bulky.

To overcome the various drawbacks related to pneumatic and hydraulic systems, manufacturers of thrust reversers have attempted to replace them and where possible to fit their reversers with electromechanical actuators, which are lighter and more reliable. Such a reverser is described in the document EP 0 843 089.

However, electromechanical actuators also have several drawbacks that need to be overcome to benefit fully from the advantages they bring in terms of mass and footprint gains.

In particular, electromechanical actuators require the use of a complete control system comprising the actuators, an electric motor adapted to drive the actuators, and control means for the motor and the actuators comprising an electrical circuit including power and control components, these components being susceptible to failure.

It is common in the event of failure of one of the components of this electrical circuit to shut down the control system in order to prevent any excessive overheating of this component that could cause an explosion due to the presence of explosive gases in the nacelle, or cause damage to nearby components by overheating.

Failure of one of the components of the electrical circuit often results in an increase in the intensity of the current passing through the electrical circuit.

Accordingly, the integration of a circuit breaker into the electrical circuit makes it possible to detect the failure of one of the components of the circuit and to shut down the control system if the current passing through the electrical circuit exceeds a predetermined threshold value.

However, the use of a circuit breaker does not enable detection of all component failures in the electrical circuit. Indeed, the failure of certain components has little or no effect on the intensity of the current passing through the electrical circuit.

BRIEF SUMMARY

This invention is intended to improve the protection of a propulsion unit comprising a nacelle and a turbojet engine against the risks related to failures of the control system for at least one actuator.

This invention is therefore intended to resolve this drawback.

For this purpose, this invention relates to a control system for at least one actuator for the cowlings of a turbojet engine thrust reverser comprising:
  at least one actuator for a cowling driven by at least one electrical motor,
  control means for the electric motor and the actuator,
characterized in that
the control system includes an electrical circuit comprising:
  several electrical components,
  a plurality of measurement means adapted for measuring respectively a characteristic magnitude of an electrical component or a group of electrical components in the electrical circuit,
  fault detection means adapted for detecting a fault in a component of the electrical circuit when the characteristic magnitude measured for this component exceeds a predetermined value or is in a predetermined range of values.

By placing the measurement means at the components most susceptible to failure, it is possible to help the detection means to detect failures in any of these components.

Thus, the control system according to the invention makes it possible to protect the turbojet engine against explosion risks.

According to one embodiment of the invention, the control system includes fault isolation means adapted to inhibit the operation of the component or group of components in which a fault has been detected.

This set-up makes it possible to inhibit only the operation of the component or group of components in which a fault has been detected and therefore to maintain operation of the other components in the control system.

Furthermore, according to this set-up, the failure of this component or group of components is isolated automatically, i.e. without user intervention, which helps to further improve the safety of the control system.

According to another embodiment of the invention, the control system includes fault isolation means adapted to reduce the control currents output from the electrical circuit.

This set-up makes it possible to remain in a degraded operation mode in the event of a non-blocking failure of the control system.

Preferably, the fault isolation means are integrated into the controller.

According to another embodiment of the invention, the control system includes means of communication between the control means and a control system of the aircraft, the communication means being adapted to inform a user of the presence of a fault in a component of the electrical circuit.

Preferably, the communication means are adapted to receive a control system inhibition command from the user.

Thus, the user can inhibit the control system if he believes that the failure detected so requires.

Furthermore, this communication means structure enables the control system to not have a circuit breaker but to use a circuit breaker placed in the plane upstream of the control system. This set-up enables a weight saving as well as preventing any unwanted inhibition of the control system as a result of unexpected triggering of the circuit breaker.

Advantageously, the electrical circuit includes at least one temperature measurement sensor adapted to measure the temperature of a component of the electrical circuit.

Preferably, the electrical circuit includes at least one voltage measurement sensor adapted to measure the voltage at the terminals of a component of the electrical circuit.

According to one embodiment of the invention, the electrical circuit includes at least one current measurement sensor adapted to measure the current passing through a component of the electrical circuit.

According to an embodiment of the invention, the control means include control means for the power input of the motor which are linked to measurement means for at least one magnitude characterizing their operation.

BRIEF DESCRIPTION OF THE DRAWINGS

The invention is explained in greater detail in the description below with reference to the schematic drawing attached showing, by way of a non-exhaustive example, an embodiment of this control system.

FIG. 1 is a partial schematic perspective view of a nacelle including a cascade thrust reverser.

FIG. 2 is a schematic representation of the mobile cowlings and their actuating system.

DETAILED DESCRIPTION

Figure 3:
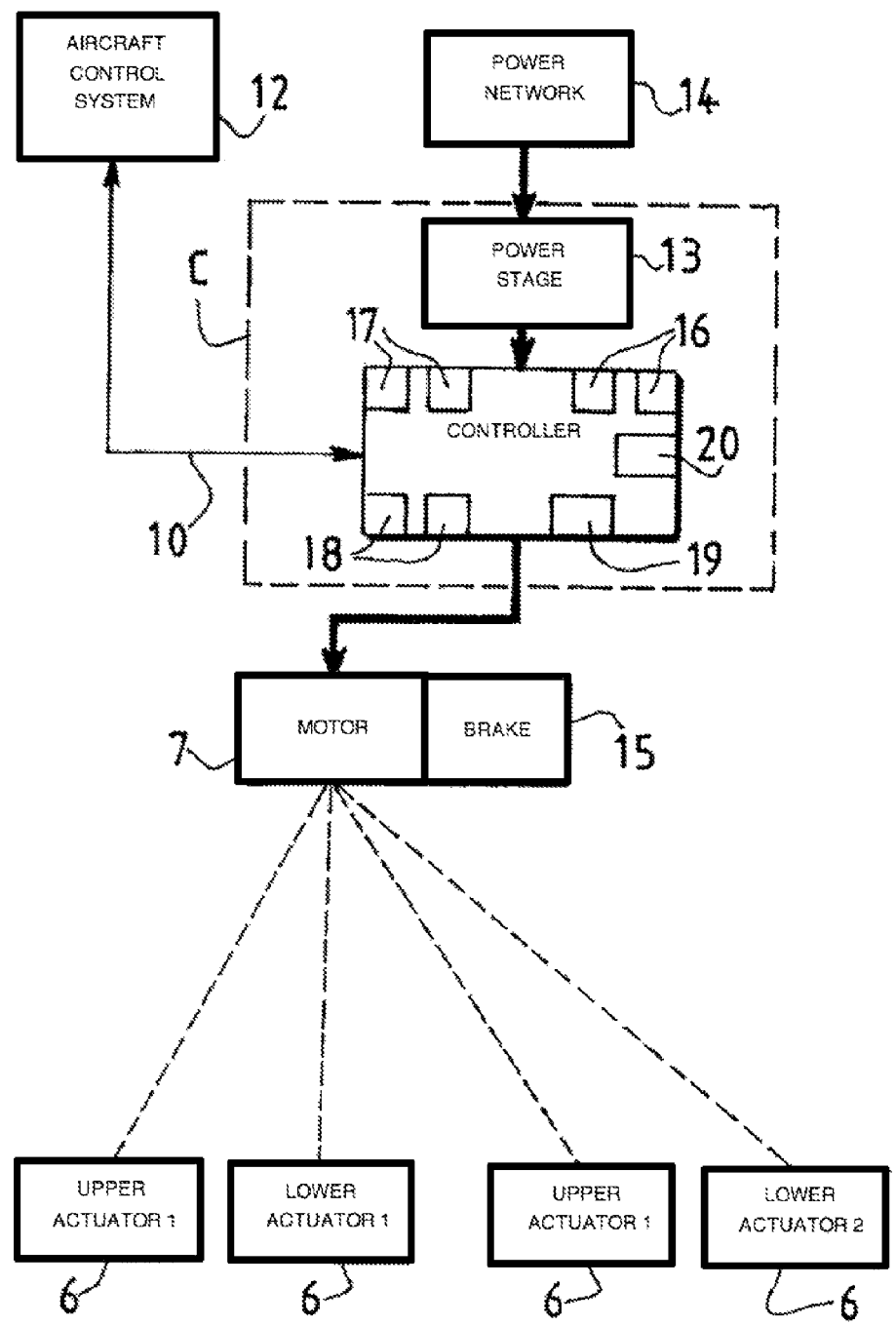
FIG. 3 is a schematic representation of the control system for the mobile cowling actuators.

Before describing in detail an embodiment of the invention, it should be noted that the system described is not limited to one type of reverser in particular. Although illustrated with a cascade reverser, the invention could be implemented with different reverser designs, notably door reversers.

FIG. 1 is a partial schematic view of a nacelle including a thrust reverser 1. The turbojet engine is not shown. This thrust reverser 1 has a structure comprising two semicircular mobile cowlings 2 that can slide away to reveal the deviation cascades 3 placed between the mobile cowlings 2 and a section for the passage of the air flow 4 to be deviated. The blocking doors 5 are arranged inside the structure such that they can pivot and move from a position in which they do not obstruct the passage of the air flow 4 to a position in which they do obstruct this passage. In order to coordinate the opening of the mobile cowlings 2 with a blocking position of the blocking doors 5, the latter are linked mechanically to the mobile cowling 2 using hinges and to the fixed structure using a system of rods (not shown).

The movement of the mobile cowlings 2 along the outside of the structure is ensured by a set of jacks 6a, 6b mounted on a front frame housing an electric motor 7 and flexible transmission shafts 8a, 8b respectively connected to the jacks 6a, 6b to actuate them.

The actuating system for the mobile cowlings 2 is shown separately in FIG. 2. Each mobile cowling 2 may be moved under the action of three jacks 6a, 6b, comprising a central jack 6a and two additional jacks 6b, actuated by a single electric motor 7 connected to control means 9, comprising a microcontroller. The power supplied by the electric motor 7 is first delivered to the central jacks 6a via the two flexible transmission shafts 8a, and then to the additional jacks 6b via the flexible transmission shafts 8b.

According to a variant not shown, only two jacks (upper and lower) are used for each cowling, actuated by a single electric motor connected to a control interface. The power supplied by the electric motor is delivered to the two jacks (upper and lower) via two flexible transmission shafts 8a.

FIG. 3 shows schematically a control system for actuating the two cowlings with two actuators (upper and lower) for each cowling.

As shown in FIG. 3 a control system for the actuators of a thrust reverser according to the invention includes control means for the electric motor 7 comprising a microcontroller 9.

This microcontroller 9 is connected by communication means 10 to the control system 12 of the aircraft.

The control system also includes a power stage 13 connected to the power network 14 of the aircraft, the power stage comprising a parasitic load resistor (PLR), an autotransformer and a rectifier that constitute hotspots susceptible to failure.

The microcontroller 9 enables control of an electric motor 7 and the jacks or actuators 6 as described above. The motor also includes a brake 15 also controlled by the microcontroller 9.

The control system includes an electrical circuit C arranged on one or more circuit boards and comprising:
- the microcontroller 9,
- the power stage 13,
- several electrical components,
- a plurality of temperature measurement sensors 16 arranged on the microcontroller and adapted to measure respectively the temperature of an electrical component or a group of electrical components in the electrical circuit,
- a plurality of voltage measurement sensors 17 arranged on the microcontroller and adapted to measure respectively the voltage at the terminals of an electrical component or a group of electrical components in the electrical circuit,
- a plurality of current measurement sensors 18 arranged on the microcontroller and adapted to measure respectively the intensity of the current passing through an electrical component or a group of electrical components in the electrical circuit,
- fault detection means 19 adapted to detect a fault in a component of the electrical circuit if the characteristic magnitude measured for this component exceeds a predetermined threshold value or is in a predetermined range of values,
- fault isolation means 20 adapted to inhibit the operation of the component or group of components in which a fault has been detected.

The electrical circuit C also includes an inverter controlled by IGBTs at the microcontroller 9.

These IGBTs constitute one embodiment of the control means for the motor power input. These control means for the motor power input are hotspots susceptible to failure.

The electrical circuit C also includes an IGBT of the PLR at the microcontroller 9.

The electrical circuit C also includes measurement means (not shown in the figures) placed on the microcontroller and the power stage and adapted to measure respectively a characteristic magnitude of the PLR, the autotransformer, the rectifier, the IGBTs of the inverter, and the IGBT of the PLR.

The control system also includes means of communication 10 between the control means and a control system of the aircraft, the communication means being adapted firstly to inform a user of the presence of a fault in a component of the electrical circuit, and secondly to receive a control system inhibition command from the user.

As a result, the user is always alerted to the presence of a fault in the controller and may inhibit the entire control system if he believes this fault so requires.

According to another embodiment of the invention, the fault isolation means 20 are adapted to reduce the control currents output from the electrical circuit.

As a result, although the control system is operating in a degraded mode, the thrust reverser can nonetheless be used.

Naturally, the invention is not limited solely to the embodiment of this control system, described above by way of an example, but includes all possible variants.

The invention claimed is:

1. A control system for at least one actuator for cowlings of a turbojet engine thrust reverser comprising:
   at least one actuator for a cowling driven by at least one electric motor;
   a control means for the electric motor and the actuator, said control means further including a controller and control means for a power input of the motor which are linked to a measurement means for at least one magnitude characterizing their operation,
   wherein the control system includes an electrical circuit comprising:
   the controller;
   several power electrical components comprising a parasitic load resistor, an autotransformer and a rectifier;
   several control electrical components comprising a power transistor of an inverter, and/or a power transistor of the parasitic load resistor; and
   at least one temperature measurement sensor, at least one voltage measurement sensor and at least one intensity measurement sensor, adapted for measuring respectively a temperature of, a voltage at terminals of, and an intensity of a current passing through one of the power or control electrical components or a group of the power or control electrical components in the electrical circuit;
   wherein the control system is adapted to detect a fault in a power or control electrical component of the electrical circuit if the temperature, the voltage or the intensity measured exceeds a predetermined value or is in a predetermined range of values, and the controller further being adapted to inhibit the operation of the component or group of power or control electrical components in which a fault has been detected.

2. The system as claimed in claim 1, wherein the control system includes the controller adapted to reduce control currents output from the electrical circuit.

3. The system as claimed in claim 1, wherein the control system includes means of communication between the control means and the control system of the aircraft, the communication means being adapted to inform a user of the presence of a fault in a component of the electrical circuit.

4. The system as claimed in claim 3, wherein the communication means are adapted to receive a control system inhibition command from a user.

* * * * *